United States Patent

Pomerantz

[11] 3,839,701
[45] Oct. 1, 1974

[54] AUTOMOTIVE VEHICLE DISPLAY SYSTEM
[75] Inventor: Allen J. Pomerantz, Flint, Mich.
[73] Assignee: General Motors Corporation, Detroit, Mich.
[22] Filed: Aug. 1, 1973
[21] Appl. No.: 384,483

[52] U.S. Cl. .......... 340/52 F, 340/324 R, 340/373, 340/378, 340/412
[51] Int. Cl. .......................................... G08b 19/00
[58] Field of Search ........ 340/21, 52 F, 225, 324 A, 340/324 B, 373, 378, 412, 414, 415, 52 R, 27, 325, 379

[56] References Cited
UNITED STATES PATENTS

| | | | |
|---|---|---|---|
| 2,965,727 | 12/1960 | Passman | 340/324 R |
| 2,998,596 | 8/1961 | Murphy | 340/324 R |
| 3,329,805 | 7/1967 | Wells | 340/324 R |
| 3,660,814 | 5/1972 | Fales | 340/52 F |

Primary Examiner—John R. Caldwell
Assistant Examiner—Joseph E. Nowicki
Attorney, Agent, or Firm—Howard N. Conkey

[57] ABSTRACT

A rotatable translucent drum has a plurality of messages spaced therearound representing events both critical and noncritical in nature which may occur at various remote points in a vehicle A drive motor is energized upon the occurrence of one of the events to index the drum to position the message representing the occurred event adjacent the viewing window. A circuit is provided to energize one of two lamps immediately upon the occurrence of an event to indicate whether the occurred event is critical or noncritical in nature and to energize a legend lamp when the message representing the occurred event is positioned adjacent the viewing window so as to illuminate the message to provide an indication of the specified event which has occurred.

2 Claims, 6 Drawing Figures

AUTOMOTIVE VEHICLE DISPLAY SYSTEM

This invention relates to an automotive vehicle display system including a rotary display device rotated upon the occurrence of one of a plurality of events to position a message representing the occurrence of said event adjacent a viewing window and including an indicating circuit for providing an immediate indication to the vehicle operator of the nature of the occurred event and for illuminating a lamp when the message representing the occurred event is positioned adjacent the viewing window so as to illuminate the message and provide an indication of the specific event which occurred.

In the operation of automotive vehicles, increasing use is being made of warning indication devices for indicating the occurrence of events at remote locations. For each event, there is provided a viewing window and a lamp therebehind which illuminates a message on the window upon the occurrence of the event associated therewith. Because of the increasing number of these warning devices, the space required for providing all of the desired warning indications becomes increasingly greater. The use of a rotary display device having a plurality of messages spaced therearound representing events which may occur at remote locations in the vehicle permits the use of a single viewing window to provide an indication of the occurrence of any of a plurality of events. This is accomplished by positioning the drum adjacent the viewing window and rotating the drum upon the occurrence of an event to position the message representing said occurrence adjacent the viewing window and illuminating the message when so positioned. Because of the time delay involved between the occurrence of an event and the rotation of the drum to position the message representing said event adjacent the viewing window, it is desirable to provide an immediate indication to the vehicle operator of the nature of the occurred event, i.e., whether critical or noncritical in nature. It is the general object of this invention to provide a circuit for use with a rotary display device for isolating events critical in nature from events noncritical in nature and providing an immediate indication of the nature of an occurred event.

It is another object of this invention to provide a circuit for use with a rotary display device responsive to the occurrence of an event for indexing the rotary display device, for providing an immediate indication of the nature of the occurred event and for illuminating the message representing the occurred event when said drum is indexed to position said message adjacent a viewing window.

These and other objects of this invention may be best understood by reference to the following description of a preferred embodiment of the invention and the drawings in which.

Figure 1:
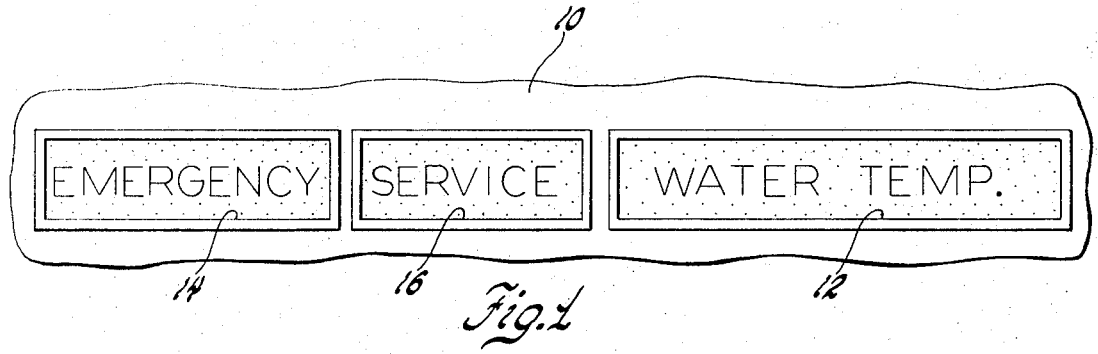
FIG. 1 is an illustration of the display area of a vehicle dash for providing an indication of the specific event and the nature thereof.

Referring to FIG. 1, a viewing station on the vehicle dash 10 includes a viewing window 12, a tell-tale window 14 having the message EMERGENCY printed thereon and a tell-tale window 16 having the message SERVICE printed thereon. The viewing window 12 and the tell-tale windows 14 and 16 are in a position on the dash 10 so as to be readily observable by the vehicle operator.

Referring to FIGS. 2 through 5, the vehicle display system of this invention includes a translucent and insulating drum 18 having a plurality of messages such as ALTERNATOR, WATER TEMPERATURE, WASHER FLUID, OIL PRESSURE, etc., spaced therearound. The messages on the drum 18 represent events of two types which may occur at remote locations in the vehicle, the occurrences of which are to be indicated to the vehicle operator. One type of event which may occur are those which are noncritical in nature, such as washer fluid level, which does not require immediate action by the vehicle operator. The second type of event which may occur are those which are critical in nature and require immediate action by the vehicle operator. This type of event may be, for example, loss of brake fluid, loss of engine oil pressure, etc. A toothed driven member 20 is secured in a concentric relationship to one end of the drum 18. A sleeve 22 extends through and is secured to a bracket 24. A pin 26 extends through the sleeve 22 and the driven member 20 and is laterally secured by a holding ring 28 in a groove in the pin 26. The interface between the driven member 20 and the pin 26 forms a bearing surface 30 which rotatably supports one end of the drum 18. The other end of the drum 18 extends into a circular recess in the bracket 24 with interface therebetween forming a second bearing surface 32 which rotatably supports the drum 18.

The drum 18 is rotated by a motor 34 which is secured to the bracket 24 by a fastener 36. The motor 34 includes a solenoid 38 and an armature 40, the armature 40 being pivotally connected to the bracket 24 by a pin 42. The pin 42 and the armature 40 are laterally secured by a pair of holding rings 44 and 46 and a sleeve 48. The armature 40 includes an acutating portion comprised of an arm 50 and an arm 52 which alternately engage the teeth of the driven member 20 as the armature 40 is reciprocally pivoted about the axis of the pin 42. The armature 40 is biased away from the solenoid 38 so that the arm 52 engages the driven member 20 by a spring 54 which has one end secured to the armature 40 and the other end secured to an extension 56 affixed to the bracket 24 by a screw 58.

The bracket 24 with the attached drum 18 and drive motor 34 is mounted in any conventional manner within the vehicle behind the dash 10 and adjacent the viewing window 12 so that the messages on the drum 18 are observable by the vehicle operator through the viewing window 12.

When the solenoid 38 is energized, the armature 40 is magnetically attracted thereto and is pivoted about the axis of the pin 42 against the force of the spring 54 to cause the arm 50 to engage one of the teeth on the driven member 20 and index the drum 18 through a first angle. Upon deenergization of the solenoid 38, the armature 40 is pivoted about the axis of the pin 42 by the return force of the spring 54 to cause the arm 52 to engage one of the teeth on the driven member 20 to further index the drum 18 through a second angle. The number of teeth on the driven member 20 and the movement of the armature 40 when the solenoid 38 is energized and then deenergized is such that the drum 18 is indexed through a net angle to rotate the message adjacent the viewing window 12 away therefrom and to position the next message on the drum 18 adjacent thereto. By repeating the cycle of energizing and deenergizing the solenoid 38, the messages on the drum 18 are sequentially positioned adjacent the viewing window 12. For example, assuming the message WASHER FLUID is positioned adjacent the viewing window 12 when the solenoid 38 is energized, the arm 50 is moved to engage one of the teeth on the driven member 20 to index the drum 18 through the first angle to rotate the message WASHER FLUID away from the viewing window 12 and the message WATER TEMPERATURE toward the viewing window 12. Upon deenergization of the solenoid 38, the spring 54 moves the arm 52 into engagement with a tooth on the driven member 20 to further index the drum 18 through the second angle to position the message WATER TEMPERATURE adjacent the viewing window 12.

A lamp holder 60 is secured to the bracket 24 by a screw 62 and extends into the drum 18 through an opening in the bracket 24. A lamp socket 64 is attached to the lamp holder 60 and carries a legend lamp 66 which, when energized, illuminates the message on the drum 18 which is positioned adjacent the viewing window 12.

A terminal block 68 is secured to the bracket 24 by a screw 70 and carries a plurality of switches 72, the number of switches 72 being equal to the number of messages spaced around the drum 18. Each of the switches 72 is associated with a respective one of the messages on the drum 18 and includes a normally closed contact NC, a normally open contact NO and a movable contact MC normally engaging the normally closed contact NC. The movable contact MC of each of the switches 72 extends from the terminal block 68 and engages the surface of the drum 18 while also engaging the normally closed contact NC. As illustrated in the preferred embodiment, ten switches 72 corresponding to ten messages spaced around the drum 18 are shown arranged in pairs opposite to one another.

Figure 2:
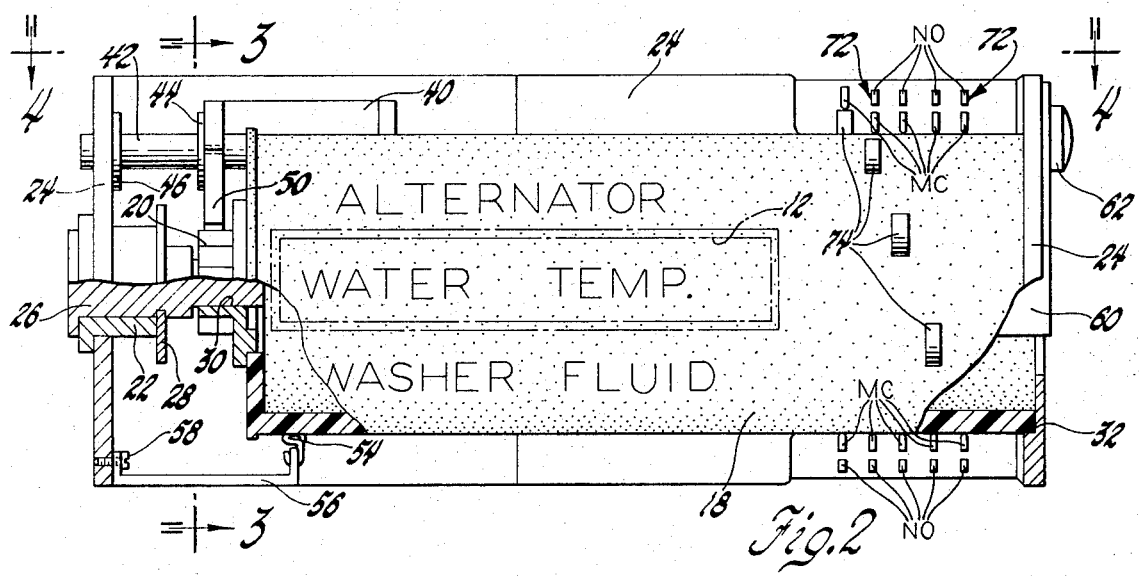
FIG. 2 is a front view of the rotary display device in the preferred embodiment of this invention.
Figure 3:
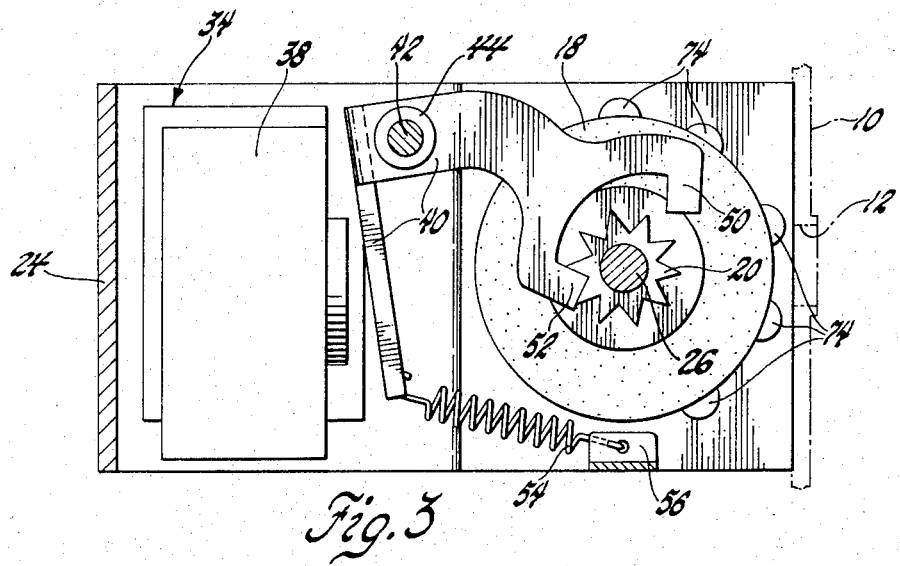
FIG. 3 is a drawing of the drum indexing motor as viewed along lines 3—3 of FIG. 2.
Figure 4:
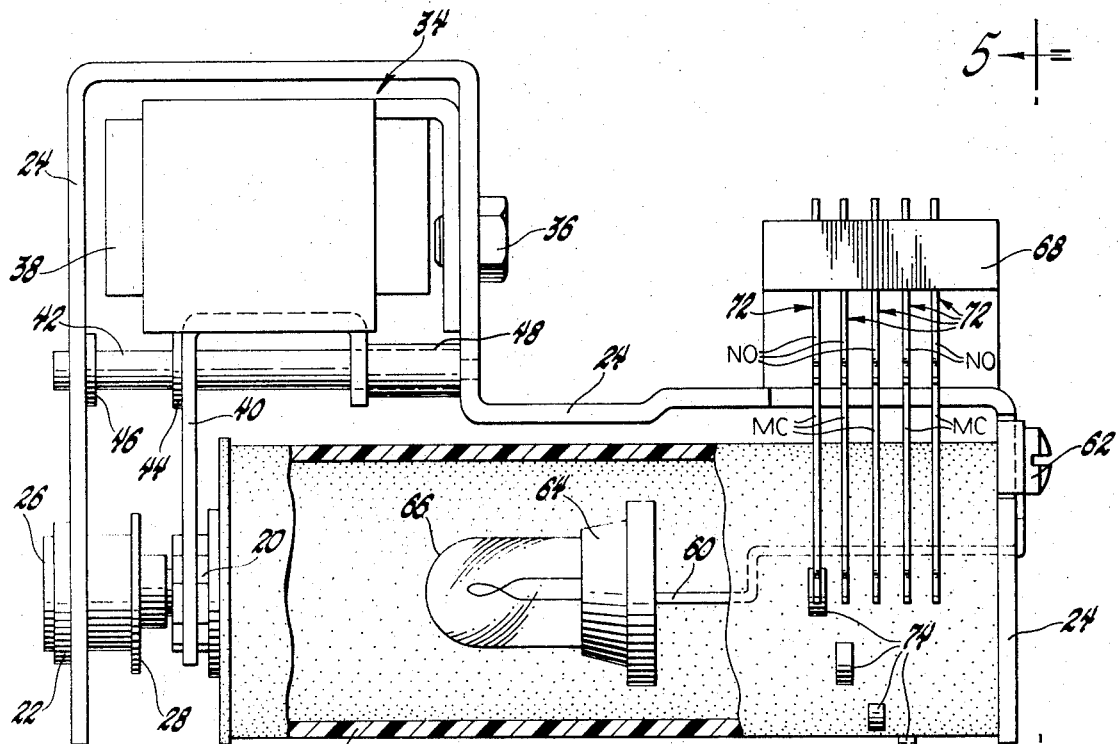
FIG. 4 is a drawing of the rotary display device as viewed along lines 4—4 of FIG. 2.
Figure 5:
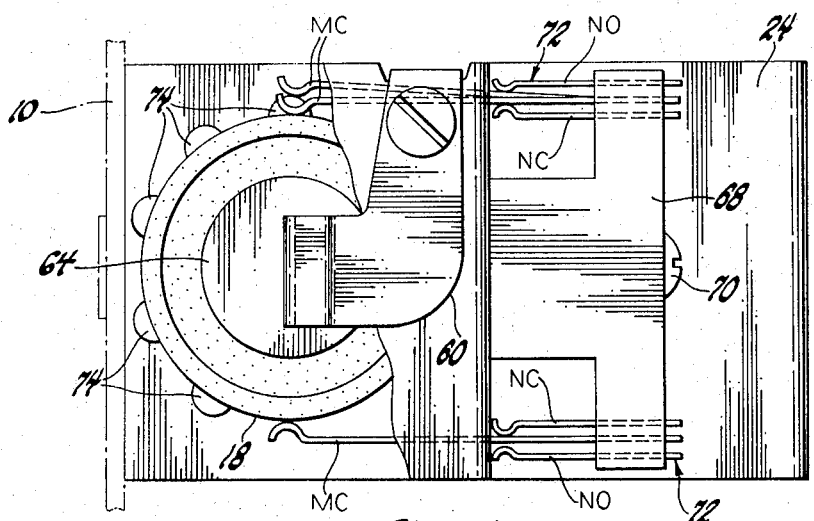
FIG. 5 is a drawing of the rotary display device as viewed along lines 5—5 of FIG. 4.

A plurality of cams 74 are carried on the surface of the drum 18 at unique angular positions. The relative positions of the cams 74 and the movable contacts MC of the switches 72 are such that when the drum 18 is rotated, the movable contact MC of each of the switches 72 is moved from engagement with the normally closed contact NC of said switch and into engagement with the normally open contact NO thereof when the message with which said switch 72 is associated is positioned adjacent the viewing window 12. For example, as illustrated in FIGS. 2, 4 and 5, the switch 72 which is positioned furthest inward from the end of the drum 18 and which engages the top of the drum 18 is associated with water temperature and the movable contact MC thereof is moved into engagement with the normally open contact NO thereof when the message WATER TEMPERATURE is positioned behind the viewing window 12 as shown.

In the preferred embodiment, with the ten switches 72 arranged in pairs opposite to one another as shown, five cams 74 are required to accomplish the foregoing switching. It can be seen that if the switches 72 were arranged other than in pairs as shown, a different number of cams 74 would be required to actuate the switches 72 in proper relationship to the angular position of the drum 18.

Figure 6:
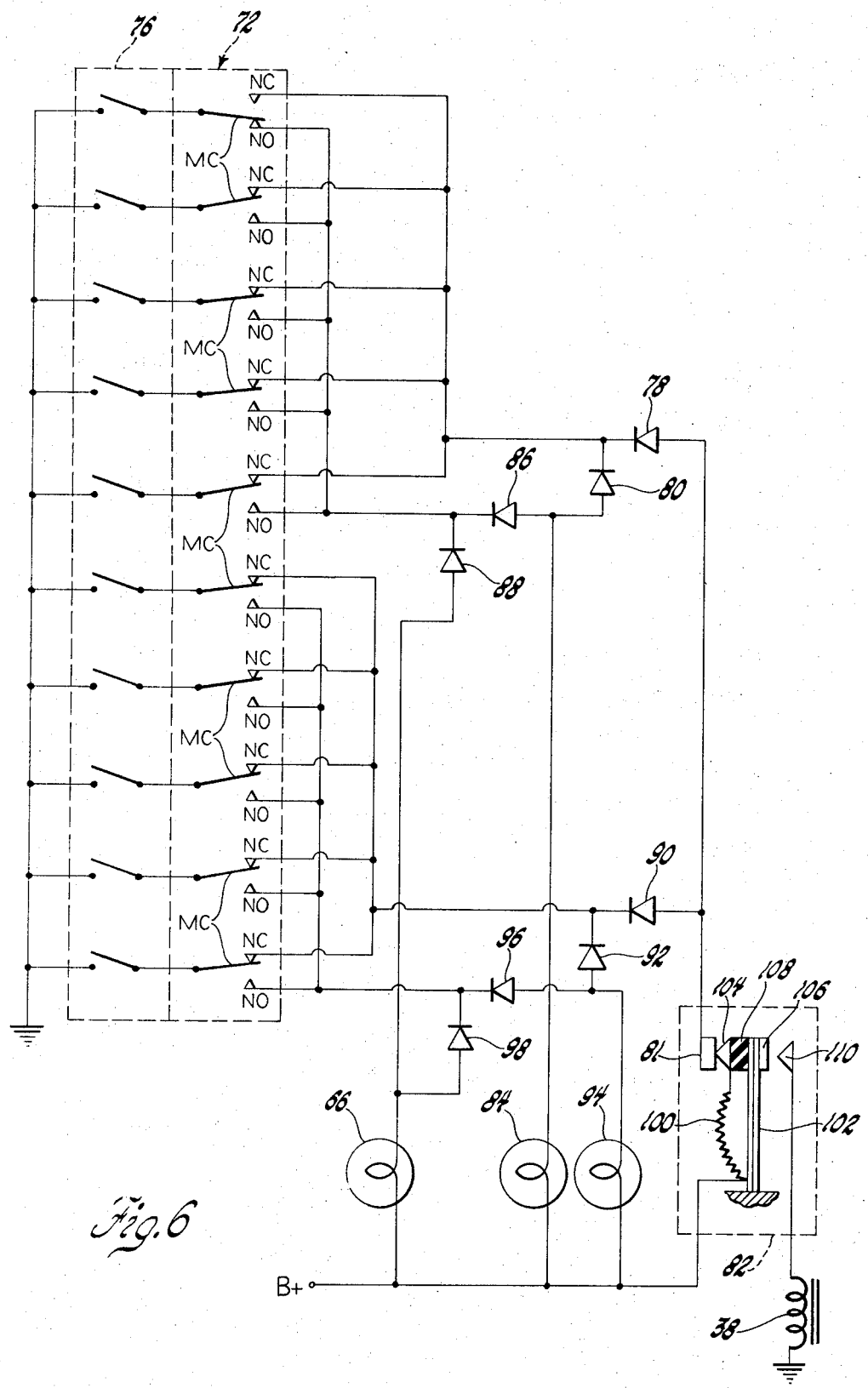
FIG. 6 is a schematic drawing of the circuit for energizing the drum indexing motor and for energizing the lamps for providing an indication of the type of event which has occurred and for illuminating the message representing the specific event which has occurred.

Referring to FIG. 6, there is shown a circuit for use in conjunction with the rotary display device for rotating said device upon the occurence of an event so as to position the message corresponding to said event adjacent the viewing window 12 and for providing an immediate indication, upon said occurrence, of the type of event which has occurred.

A plurality of normally open event sensors 76 are positioned at remote locations in the vehicle. Each of the event sensors are operative to sense the occurrence of a respective one of the events represented by the messages on the drum 18. One side of each event sensor 76 is grounded and the other side thereof is coupled to the movable contact MC of the switch 72 associated with the message on the drum 18 representing the occurrence of the event sensed by said event sensor 72. Upon the occurrence of one of the events, the event sensor 76 which senses this occurrence closes to supply a ground signal to the movable contact MC of the switch 72 with which it is coupled.

All of the normally closed contacts NC of the switches 72 associated with the messages of the type classified as critical in nature are coupled to the cathodes of a diode 78 and a diode 80. The anode of the diode 78 is coupled to a terminal 81 in a thermal time delay circuit 82 and the anode of the diode 80 is coupled to a positive voltage source B+ which may be, for example, the vehicle battery, through a lamp 84. The lamp 84 is positioned behind the tell-tale window 14 in the dash 10 to illuminate the message EMERGENCY when energized. The normally open contacts NO of the switches 72 associated with the messages of type classified as critical in nature are coupled to the cathodes of a diode 86 and a diode 88. The anode 86 is coupled to the positive voltage source B+ through the lamp 84 and the anode of the diode 88 is coupled to the positive voltage source B+ through the legend lamp 66 carried internal of the drum 18 as seen in FIG. 4. The legend lamp 66, when energized, illuminates the message on the drum 18 which is positioned adjacent the viewing window 12 in the dash 10.

The normally closed contacts NC of the switches 72 associated with the messages of the type classified non-critical in nature are coupled to the cathodes of a diode 90 and a diode 92. The anode of the diode 90 is coupled to the thermal time delay circuit 82 and the anode of the diode 92 is coupled to the positive voltage source B+ through a lamp 94. The lamp 94 is positioned behind the tell-tale window 16 in the dash 10 and illuminates the message SERVICE when energized.

The normally open contacts NO of the switches 72 associated with the messages of the type classified non-critical in nature are coupled to the cathodes of a diode 96 and a diode 98. The anode of the diode 96 is coupled to the positive voltage source B+ through the lamp 94 and the anode of the diode 98 is coupled to the positive voltage source B+ through the lamp 66.

The time delay circuit 82 in the preferred embodiment takes the form of a thermal time delay switch and includes a heater element 100 coupled to the positive voltage source B+ and a bimetal element 102 also coupled to the positive voltage source B+. The heater element 100 and the bimetal element 102 terminate at respective terminals 104 and 106 on opposite sides of a movable insulating contact block 108.

When the heating element 100 is deenergized and consequently cooled, the bimetal element 102 moves the contact block 108 so that the terminal 104 engages the terminal 81. When the heating element 100 is energized by a ground signal applied to the terminal 81, the bimetal element 102 is heated thereby to move the contact block 108 so that the terminal 106 engages a terminal 110. The terminal 110 is coupled to the solenoid 38 of the drive motor 34. Upon engagement of the contacts 106 and 110, the solenoid 38 is coupled therethrough to the source B+ and is energized thereby. Upon movement of the contact block 108 away from the terminal 81, the ground signal applied to the heating element 100 through the terminal 81 is removed resulting in the cooling of the bimetal element 102. The bimetal element 102 is responsive to the decreased temperature to move the contact block 108 to again engage the terminals 81 and 104 and disengage the terminals 106 and 110. Consequently, the solenoid 38 is deenergized. For as long as the ground signal is applied to the terminal 81, the thermal time delay circuit 82 oscillates to periodically energize and deenergize the solenoid 38 to sequentially position the messages on the drum 18 adjacent the viewing window 12 of the dash 10 as previously described for a time period determined by the time required for the heating element 100 to heat the bimetal element 102 to a temperature which causes the bimetal element 102 to move the terminal 106 into engagement with the terminal 110.

In operation, upon the occurrence of an event of the type which is noncritical in nature, the event sensor 76 which monitors the occurrence of that event closes to supply a ground signal to the switch 72 connected therewith. This ground signal is coupled through the diode 92 to the lamp 94 which is energized thereby to illuminate the message SERVICE on the tell-tale window 16 to provide an immediate indication to the vehicle operator that an event of the type noncritical in nature has occurred which does not require his immediate attention. The ground signal is also coupled to the time delay circuit 82 through the diode 90, the time delay circuit 82 being responsive thereto for periodically energizing and deenergizing the solenoid 38 as previously described to index the drum 18. When the message representing the occurred event is positioned adjacent the viewing window 12 on the dash 10, the movable contact MC of the switch 72 which is coupled to the event sensor 76 which monitored said event is moved from engagement with the normally closed contact NC of said switch 72 into engagement with the normally open contact NO thereof to remove the ground signal from the time delay circuit 82 and to couple the ground signal to the lamp 94 through the diode 96 and to the legend lamp 66 through the diode 98. The lamp 94 is therefore maintained energized and the legend lamp 66 is energized to illuminate the message adjacent the viewing window 12 so as to provide an indication to the vehicle operator of the specific event which occurred.

Upon the occurrence of an event of the type critical in nature, the event sensor 76 which monitors the occurrence of that event closes to supply a ground signal to the switch 72 connected therewith. This ground signal is coupled through the diode 80 to the lamp 84 which is energized thereby to illuminate the message EMERGENCY on the tell-tale window 14 to provide an immediate indication to the vehicle operator that an event critical in nature has occurred which requires his immediate attention. In addition, the ground signal is applied to the time delay circuit 82 through the diode 78 to index the drum 18 as previously described. When the drum 18 is rotated to position the message representing the occurred event adjacent the viewing window 12, the movable contact of the switch 72 connected to the event sensor 76 which monitored the occurrence of the event which was critical in nature is moved from the normally closed contact NC thereof to deenergize the time delay circuit 82 and into engagement with the normally open contact NO thereof to maintain the lamp 84 energized through the diode 86 and to energize the legend lamp 66 through the diode 88. Energization of the legend lamp 66 illuminates the message positioned adjacent the viewing window 12 to provide an indication of the specific event which occurred.

When two or more events occur as sensed by the event sensors 76, the drum 18 is continually indexed, as the time delay circuit 82 is continually energized by a ground signal applied thereto, so as to sequentially position each of the messages on the drum 18 adjacent the viewing window 12 for a time period determined by the time delay of the time delay circuit 82. Each time a message on the drum 18 representing the occurrence of one of the occurred events is positioned adjacent the viewing window 12, the legend lamp 66 is energized to illuminate the message and provide an indication of the specific event which has occurred and the lamp 84 and/or the lamp 94 is continually energized to provide an indication of the type of event which has occurred. The delay time of the time delay circuit 82 is made such that each message is illuminated for a time duration which ensures that the vehicle operator has sufficient time to observe th indication of the occurred event.

As a result of the time delay of the time delay circuit 82 which maintains each of the messages on the drum 10 adjacent the viewing window 12 for a predetermined time duration as the drum 18 is being indexed, considerable time may lapse from the occurrence of an event to the positioning of the message representing that occurrence adjacent the viewing window 12. If the event which occurred is critical in nature, immediate action may be required by the vehicle operator such as bringing the vehicle to a stop and turning off the vehicle engine. The circuit described provides an immediate indication of the type of event which occurred so that the vehicle operator can take immediate action if the occurred event is critical in nature and while the drum 18 is being indexed to provide an indication of the specific event which occurred.

As can be seen, when an event has occurred which is noncritical in nature, the diodes 78 and 96 prevent the lamp 84 and the legend lamp 66 from being energized while the time delay circuit 82 is energized through the diode 90 and the diode 92 and the diode 88 prevent the lamp 84 and the time delay circuit 82 from being energized when the legend lamp 66 is energized to provide an indication of the specific event which occurred. In like manner, upon the occurrence of an event of the type which is critical in nature, the diode 86 and the diode 90 prevent the energization of the legend lamp 66 and the lamp 94 while the time delay circuit 82 is energized through the diode 78 and the diodes 80 and 98 prevent the energization of the time delay circuit 82 and the lamp 94 when the legend lamp 66 is energized to provide an indication of the specific event which occurred.

The detailed description of a preferred embodiment of the invention for the purpose of explaining the principles thereof is not to be considered as limiting or restricting the invention, since many modifications may be made by the exercise of skill in the art without departing from the scope of the invention.

I claim:

1. An automotive vehicle display system comprising: first and second groups of event sensors positioned at remote locations in the vehicle, each of the event sensors in the first group being responsive to the occurrence of a respective event of a first type for generating an electrical signal and each of the event sensors in the second group being responsive to the occurrence of a respective event of a second type for generating an electical signal; a viewing window; a drum rotatably supported adjacent the viewing window; a plurality of messages spaced around the drum so as to be sequentially positioned adjacent the viewing window as the drum is indexed, each of said messages representing the occurrence of a respective one of the events of the first and second types; a plurality of switch means, each of the switch means being associated with a respective one of the event sensors in the first and second groups and having a normally closed contact, a normally open contact and a movable contact normally engaging the normally closed contact; means coupling the movable contact of each switch means to the event sensor associated therewith so as to couple an electrical signal generated by said event sensor to said movable contact; means responsive to the angular position of the drum for shifting the movable contact of the switch means associated with the event sensor which monitors the occurrence of the event represented by the message adjacent the viewing window from engagement with the normally closed contact of said switch means to engagement with the normally open contact thereof; drive means for indexing the drum; a legend lamp for illuminating the message adjacent the viewing window; warning means, the drive means, the legend lamp and the warning means each being energized by an electrical signal coupled thereto; first connecting means for electrically coupling the normally closed contacts of the switch means associated with the event sensors in the first group to the drive means; second connecting means for electrically coupling the normally open contacts of the switch means associated with the event sensors in the first group to the legend lamp; third connecting means for electrically coupling the normally closed contacts of the switch means associated with the event sensors in the second group to the drive means and to the warning means; and fourth connecting means for electrically coupling the normally open contacts of the switch means associated with the event sensors in the second group to the legend lamp and to the warning means, the third connecting means including first signal blocking means for isolating the warning means from an electrical signal coupled to the drive means through the normally closed contacts of the switch means associated with the event sensors in the first group and second signal blocking means for isolating the drive means from an electrical signal coupled to the warning means through the normally open contacts of the switch means associated with the event sensors in the second group and the fourth connecting means including third signal blocking means for isolating the legend lamp from an electrical signal coupled to the warning means through the normally closed contacts of the switch means associated with the event sensors in the second group and fourth signal blocking means for isolating the warning means from an electrical signal coupled to the legend lamp through the normally open contacts of the switch means associated with the event sensors in the first group, whereby the drive means is energized by an electrical signal generated upon the occurrence of an event to index the drum to position the message representing said occurrence adjacent the viewing window, the warning means is energized immediately upon the occurrence of an event of the second type to provide an indication thereof and the legend lamp is energized when the message representing an occurred event is positioned adjacent the viewing window.

2. An automotive vehicle display system comprising: first and second groups of event sensors positioned at remote locations in the vehicle, each of the event sensors in the first group being responsive to the occurrence of a respective event of a first type critical in nature for generating an electrical signal and each of the event sensors in the second group being responsive to the occurrence of a respective event of a second type noncritical in nature for generating an electrical signal; a viewing window; a drum rotatably supported adjacent the viewing window; a plurality of messages spaced around the drum so as to be sequentially positioned adjacent the viewing window as the drum is indexed, each of said messages representing the occurrence of a respective one of the events of the first and second types; a plurality of switch means, each of the switch means being associated with a respective one of the event sensors in the first and second groups and having a normally closed contact, a normally open contact and a movable contact normally engaging the normally closed contact; means coupling the movable contact of each switch means to the event sensor associated therewith so as to couple an electrical signal generated by said event sensor to said movable contact; means responsive to the angular position of the drum for shifting the movable contact of the switch means associated with the event sensor which monitors the occurrence of the event represented by the message adjacent the viewing window from engagement with the normally closed contact of said switch means to engagement with the normally open contact thereof; drive means for indexing the drum; a legend lamp for illuminating the message adjacent the viewing window; a critical indicator; a noncritical indicator, the drive means, the legend lamp and the critical and noncritical indicators each being energized by an electrical signal coupled thereto; first connecting means for electrically coupling the normally closed contacts of the switch means associated with the event sensors in the first group to the drive means and to the critical indicator through a first pair of diodes; second connecting means for electrically coupling the normally open contacts of the switch means associated with the event sensors in the first group to the legend lamp and to the critical indicator through a second pair of diodes; third connecting means for electrically coupling the normally closed contacts of the switch means associated with the event sensors in the second group to the drive means and to the noncritical indicator through a third pair of diodes; and fourth connecting means for electrically coupling the normally open contacts of the switch means associated with the event sensors in the second group to the legend lamp and to the noncritical indicator through a fourth pair of diodes, the first, second, third and fourth pairs of diodes being poled to pass an electrical signal from the plurality of switch means to the respective drive means, legend lamp and critical and noncritical indicators coupled therewith, whereby the drive means is energized by an electrical signal generated upon the occurrence of an event of the first or second types to index the drum to position the message representing said occurrence adjacent the viewing window, the critical or noncritical indicator is energized immediately upon the occurrence of a respective event of the first or second types to provide an indication of said type and the legend lamp is energized when the message representing an occurred event is positioned adjacent the viewing window.

* * * * *